Aug. 15, 1950      F. J. ALLEN      2,519,097
DYNAMOELECTRICAL MACHINE
Filed July 17, 1947
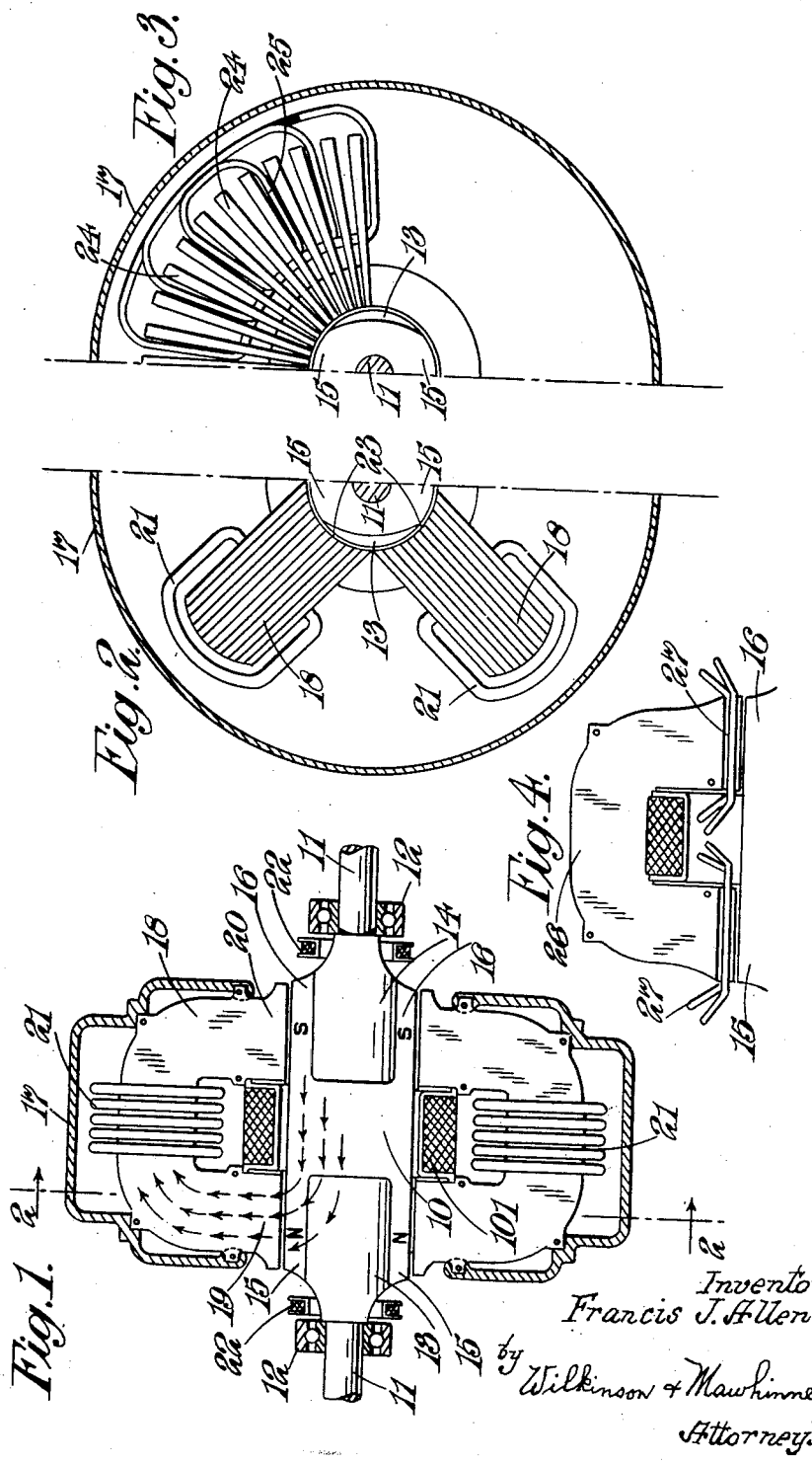
Inventor
Francis J. Allen
by Wilkinson & Mawhinney
Attorneys Patented Aug. 15, 1950

2,519,097

UNITED STATES PATENT OFFICE 2,519,097

DYNAMOELECTRICAL MACHINE

Francis James Allen, Quarndon, England, assignor to Rolls-Royce Limited, Derby, England, a British company Application July 17, 1947, Serial No. 761,693
In Great Britain June 5, 1946

Section 1, Public Law 690, August 8, 1946
Patent expires June 5, 1966

15 Claims. (Cl. 171—252)

This invention relates to dynamoelectrical machines and has for its object to provide an improved construction and arrangement thereof which is particularly suitable for machines that are required to operate at very high speeds of rotation, as for example when they are driven by high speed gas-turbines.

According to this invention a dynamoelectric machine comprises in combination, a rotor formed with complementary pole-faces spaced apart axially on it and magnetised with a unidirectional flux, a stator providing a magnetic path between said complementary pole-faces by stampings of arch or U-shape disposed longitudinally of the rotor, and an armature winding on said stator. Preferably the rotor is provided with a magnetising coil.

According to another feature of the invention the rotor is in general of plain cylindrical form with part-circumferential pole-faces provided by cutting away the cylindrical surface between them.

According to yet another feature of the invention the stator stampings may be disposed in groups or packs spaced symmetrically and uniformly around the rotor, and the radially inner ends of the stampings may constitute a continuous periphery of the rotor tunnel.

Alternatively the stator stampings may be assembled in concentrated packs for each pole-pitch.

According to yet another feature of the invention the armature coils may encircle the base portions of the U-shape stampings, or alternatively may be located at or near the end faces of each limb of the armature stampings, for example in spaces between adjacent packs of stampings or in slots provided in said end faces.

Since the rotor is magnetised axially and unidirectionally, demagnetising coils may be provided at each end to obviate any detrimental effect on the bearings, and these coils will actually assist the working flux by prevention of leakage.

In the accompanying drawings which illustrate diagrammatically various constructions in accordance with this invention, Figure 1 is a longitudinal section showing one construction, Figure 2 is a half end-view in section on the line 2—2 of Figure 1, Figure 3 is a half-sectional view showing an alternative construction, and Figure 4 is a part view in longitudinal section showing yet another construction.

Referring first to Figures 1 and 2, the rotor of the machine is a plain cylindrical forging provided at each end with a supporting shaft 11 to engage the bearings 12. At the two ends of the rotor, the cylindrical periphery is cut away at 13, 14 respectively to provide pairs of part-circumferential pole-faces 15, 16 respectively; each pole-face of the pair 15 is aligned axially with a pole-face of the pair 16 to constitute a pair of complementary pole-faces in the magnetic circuit. The cross-section of the rotor at these pole-faces is, as will be seen from Figure 2, of more or less elliptical shape. The cut away portions 13, 14 between the pole-faces provide an increased length of air-gap, whereby the desired variation in flux is obtained, this being for example of the order of ten to one.

The stator of the machine comprises a suitable frame 17 in which are mounted stampings or laminations 18 which are of arch or U-shape, disposed axially of the rotor and more or less radially thereto as hereinafter described. The ends 19, 20 of the laminations are aligned with the pole-faces at the two ends of the rotor, and their total cross-sectional area is such as to provide an adequate path for the flux between the poles as indicated by the arrows in Figure 1.

A magnetising coil 101 is mounted in the stator to surround the rotor 10 so as to magnetise it longitudinally and unidirectionally. In the particular construction illustrated each pair of pole-faces 15 and 16 extends over an aggregate of one-half of the periphery of the rotor, and the full cross-sectional area of the rotor is available to carry the flux. The axial length of the two pole-faces 15, or 16 to provide an equivalent area, is a half the diameter, but this will be increased by, say, 50% so as to reduce the air-gap flux-density, so that the combined overall length of the pole-faces 15 and 16 will be about one and a half times the diameter of the rotor. The total length of the rotor is increased by the length of the central portion between the poles 15 and 16, to provide accommodation for the armature winding 21 and the field winding 101.

The armature stampings 18 in Figures 1 and 2 are assembled in groups or packs concentrated and spaced angularly from one another as shown most clearly in Figure 2. The armature winding 21 surrounds the bases of the group of U-shaped stampings, and it will be seen that this arrangement gives a considerable saving in coil length and provides free accessibility for construction or inspection purposes and for ventilation. The coils may be entirely pre-formed and threaded on to the stampings.

Since the rotor 10 is magnetised axially and unidirectionally, there is a possibility of leakage flux at the ends through the bearings of the machine, and to avoid any detrimental effect, demagnetising coils 22 are provided at each end of the rotor between it and the respective bearings; it will be appreciated that these coils improve the concentration of the working flux by the prevention of leakage.

The groups 18 of armature stampings are preferably arranged so that their inner faces 23 adjacent the rotor, meet one another circumferentially so as completely to fill the periphery of the rotor tunnel. This promotes a high duty for the machine and gives a good wave-form, which is further capable of adjustment by grading the air-gap; since there are no slots in the faces of either the rotor or the stator, pole-face losses will be small.

In the alternative construction illustrated in Figure 3, the stator stampings 24 are distributed, in small groups or packs, radially and uniformly around the rotor and there are thereby provided spaces between them within which a distributed winding 25 may be arranged. Any of the known forms of winding may be used such as distributed variable-chord or distributed pole-pitch chord. In this case also the radially inner ends of the stampings may constitute a completely closed rotor tunnel.

In the modification illustrated in Figure 4, the armature stampings 26 are assembled as in Figure 3, but with spaces between them at their radially inner ends thus providing slots in which the armature coils 27 may be assembled in the usual manner. This construction involves the use of two sets of armature coils as compared with the previously described constructions in which only one set of coils is used.

The invention provides a construction of dynamoelectric machine which is particularly suitable for operating at very high speeds such as are required for direct coupling to a gas-turbine, since the rotor is of the simplest possible construction and the absence of slots and its small overall length compared with the normal design of alternators makes its whirling speed high. This is important in a machine which is required to operate at varying speeds, such for example as in test plants. Such a machine may well be used in combination with a rectifier for providing direct current; for example a gas-turbine-driven vehicle may have a generator as above described used in conjunction with a rectifier for battery-charging.

In the case of large machines, the construction lends itself to splitting them to provide convenient sizes and weights for transport. The stator casing 17 may be divided as required and the groups of armature laminations are each a comparatively small unit. The rotor also may be divided and could if desired be built up of thick plates or discs without much increase in magnetic reluctance, or if circumstances require it, it could be divided longitudinally.

In some cases where a lower capacity is required at a given speed, a hollow rotor may be used. Alternatively if it is desired to increase the capacity of the machine, a multiple arch construction may be used, in which two sets of armature stampings similar to those illustrated in Figure 1 are arranged longitudinally of the machine, the rotor then being provided with four sets of poles spaced apart on it instead of two sets.

I claim:
1. An alternating current dynamoelectric machine comprising in combination a rotatable, substantially cylindrical, solid rotor magnetized axially with a unidirectional flux and having axially-spaced parts thereof of varying radial dimension to provide axially aligned complementary pole formations, a stator to provide a magnetic path between the complementary pole formations comprising arch-shaped laminations disposed longitudinally and substantially radially of the axis of the rotor with the limbs of the laminations inwardly directed and with radially inner ends of the limbs together forming the substantially continuous peripheries of axially spaced rotor tunnels said tunnels respectively registering with said axially-spaced parts of the rotor, whereby during rotation of the rotor the magnetic flux in the rotor is sensibly constant and the flux in each lamination varies cyclically, and an armature winding on said laminations subjected to said cyclic flux variation.

2. An alternating current dynamoelectric machine as claimed in claim 1, wherein the rotor has part circumferential pole faces formed by cutting away the cylindrical surface of the rotor in the region of said axially-spaced parts.

3. An alternating current dynamoelectric machine as claimed in claim 1, wherein the laminations are disposed in packs spaced symmetrically and uniformly around the rotor.

4. An alternating current dynamoelectric machine as claimed in claim 3, wherein the laminations are disposed in concentrated packs for each pole-pitch.

5. An alternating current dynamoelectric machine as claimed in claim 1, comprising also a magnetizing coil for the rotor mounted between the limbs of the stator laminations.

6. An alternating current dynamoelectric machine as claimed in claim 1, wherein said armature winding comprises coils encircling the base portions of the arch-shaped laminations.

7. An alternating current dynamoelectric machine as claimed in claim 1, wherein said armature winding comprises coils located adjacent the radially inner ends of each limb of the arch-shaped laminations.

8. An alternating current dynamoelectric machine comprising in combination a rotatable, substantially cylindrical, solid rotor magnetized axially with a unidirectional flux and having axially-spaced parts thereof of varying radial dimension to provide axially aligned complementary sets of pole formations each set including a plurality of circumferentially-spaced pole faces, a stator to provide a magnetic path between the complementary pole formations comprising arch-shaped laminations disposed longitudinally and substantially radially of the axis of the rotor with the limbs of the laminations inwardly directed and with the radially inner ends of the limbs together forming the substantially continuous peripheries of axially spaced rotor tunnels within which the said axially-spaced parts of the rotor are received, whereby during rotation of the rotor the magnetic flux in the rotor is sensibly constant and the flux in each lamination varies cyclically, and an armature winding on said laminations subjected to said cyclic flux variation.

9. An alternating current dynamoelectric machine as claimed in claim 8, wherein each set of circumferentially-spaced pole-faces is formed by cutting away the cylindrical surface of the rotor at a plurality of circumferentially-spaced points.

10. An alternating current dynamoelectric machine as claimed in claim 8, wherein the laminations are disposed in packs spaced symmetrically and uniformly around the rotor.

11. An alternating current dynamoelectric machine as claimed in claim 10, wherein the laminations are disposed in concentrated packs for each pole-pitch.

12. An alternating current dynamoelectric machine as claimed in claim 8, comprising also a magnetizing coil for the rotor mounted between the limbs of the stator laminations.

13. An alternating current dynamoelectric machine as claimed in claim 8, wherein said armature winding comprises coils encircling the base portions of the arch shape laminations.

14. An alternating current dynamoelectric machine as claimed in claim 8, wherein said armature winding comprises coils located adjacent the radially inner ends of each limb of the arch-shape laminations.

15. A dynamoelectric machine comprising in combination a substantially cylindrical solid rotor magnetized axially with a unidirectional flux and having salient poles thereon providing axially aligned complementary pole formations, a stator comprising U-shaped laminations circumferentially spaced about the rotor with the leg members directed radially inwardly and forming with adjacent like members substantially continuous peripheries of axially spaced rotor tunnels, said U-shaped members providing a magnetic path between the complementary pole formations, and an armature winding on said U-shaped laminations subject to flux variations in said laminations set up by said magnetized rotor.

FRANCIS JAMES ALLEN.

REFERENCES CITED

The following references are of record in the file of this patent:

UNITED STATES PATENTS

| Number | Name | Date |
| --- | --- | --- |
| 1,763,000 | Marrison | June 10, 1930 |
| 1,799,156 | Dornig | Apr. 7, 1931 |
| 1,915,069 | Morrill et al. | June 20, 1933 |
| 1,934,766 | Krussman | Nov. 14, 1933 |
| 1,944,590 | Beeh | Jan. 23, 1934 |
| 2,015,091 | Spohn | Sept. 24, 1935 |
| 2,103,165 | Merrill | Dec. 21, 1937 |
| 2,121,699 | Janzen | June 21, 1938 |